F. W. WILLIAMS.
BALING PRESS.
APPLICATION FILED DEC. 12, 1907.
958,900.
Patented May 24, 1910.
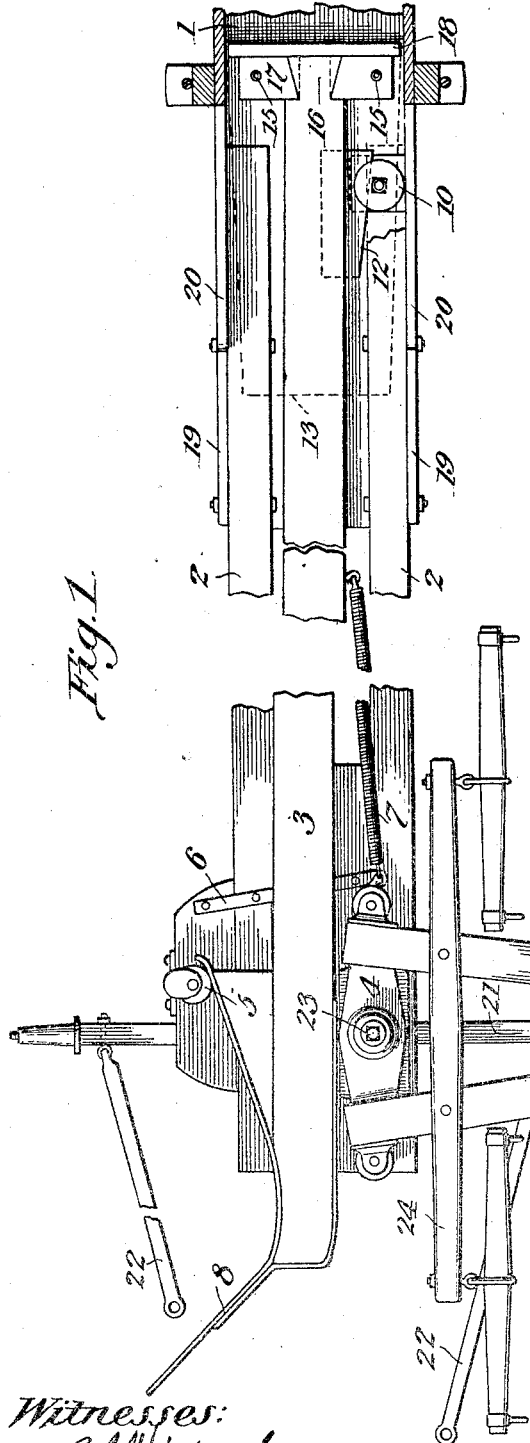
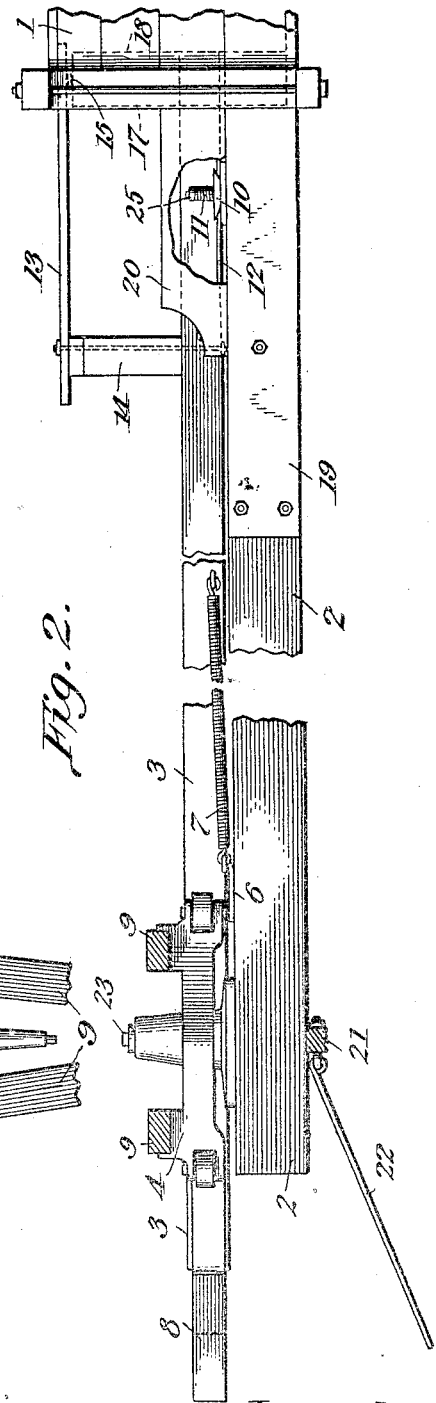
Witnesses:
Inventor,
Frederick Walton Williams

UNITED STATES PATENT OFFICE.

FREDERICK W. WILLIAMS, OF MACON, GEORGIA.

BALING-PRESS.

958,900.  Specification of Letters Patent.  Patented May 24, 1910.

Application filed December 12, 1907. Serial No. 406,215.

*To all whom it may concern:*

Be it known that I, FREDERICK WALTON WILLIAMS, a citizen of the United States, and residing at Macon, in the county of Bibb and State of Georgia, have invented a new and useful Improvement in Baling-Presses, of which the following specification and accompanying drawing are descriptive.

My object is to provide an improved baling press at a low cost.

Figure 1 is a plan, of power part at the left side and plunger and brake on right showing connections with hay chamber. The right and left are one part but broken into in the drawing to save space. Fig. 2 is a side elevation showing same part as Fig. 1.

Similar numerals relate to similar parts in both drawings.

1 is hay chamber, 2 is base sills, 3 is pitman with wear plate on bottom resting on (6), 4 is rotatable drive arm with rollers in each end, 5 is side roller against which inclined surface of pitman moves, 6 is wear plate on which pitman moves, one end of which is bent upward forming a side stop for pitman, then outward and is provided with a hook or hole or other means for attaching rebound spring, 7 is a coil rebound spring, 8 is plate extending over end of pitman to serve as a guide for pitman and keep it in the path of the drive arm after it has passed beyond the side roller, 9 is sweep, 10 rotatable rebound brake disk attached to base sill, 11 is spring held down on disk by bolt passing through both with regulating nut on top, 12 is plate attached to pitman and adapted to rebound under disk and forming a brake here, and also pressing the plunger against the bottom of the hay chamber which also serves as a brake, 13 is a feed table fastened to the pitman, the front of which rests on spring (15) which presses it up against the tucker, both gives way when the feed is too large, or is not packed down well, this prevents the plunger from getting stuck.

14 is a block between pitman and feed table. 15 is a coil spring under the feed table, 16 shows a dovetail tenon on pitman which fits into a recess in plunger frame as shown by solid lines.

17 is plunger frame, 18 is facing fastened to plunger frame, 19 is extension arms of hay chamber for connecting power part, 20 is extension of hay chamber fastened rigidly to (19) to strengthen the brace connections, 21 transport axle, 22 is axle braces detachably connected to the sweep so that the said sweep may be used for a tongue while in transport, 23 is king bolt holding cap washer on drive arm and passing through transport axle.

24 is double tree attached to sweep for using in transporting machine, 25 is brake adjusting nut.

The operation is the same as other horse power presses, the wheels are taken off and braces 22'' detached from sweep and a horse hitched to the end of sweep which travels around to the right, this presses the roller in the end of the drive arm against the side of the pitman, pushing the incline surface against side roller (5) this makes the pitman travel forward very fast at the first part of the stroke, but when about $\frac{2}{5}$ of the stroke is made drive arm roller passes around on the end of the pitman and pushes and is more powerful toward the end of stroke as the hay is more compact. When the stroke is about completed the side of the pitman comes in contact with the spring end of the wear plate (6), which is bent up to form a stop and the roller passes off of the pitman and is withdrawn by coil spring (7), and the roller in the opposite end of drive arm makes another stroke in the same manner.

Referring to the operation of the rebound brake, the plate (12) on pitman is set so as to rebound under the edge of beveled disk (11) which causes the plunger to press hard on bottom of bale chamber, which causes it to stop gradually and saves the jar on the machine caused by the rebound.

Of course it is understood that the material to be pressed is placed in the feed opening in front of the plunger after each stroke, and while it is withdrawn and in the position as shown in drawing.

The spring feed table (13) is for a two fold purpose, first to place the material to be baled on while the plunger is going forward, this allows the feeder to press it down in the hole quickly as the plunger is withdrawn. It also presses the hay at the top side of the bale and allows the tucker a better chance to work, making a much neater bale than a solid plunger, and it also prevents the plunger from getting stuck by over feeds by springing down out of the way of the tucker.

For transportation the wheels are placed in position on the axle and sweep brought around in line with the machine, the axle braces (22), then attached to the sweep and horse hitched to the swingletrees and breast chains fastened to the front end of sweep so that it may be used as tongue to pull and guide the machine with.

What I claim as new and wish to secure by Letters Patent is:—

1. In a baling press having a bale chamber a plunger, a pitman, a power mechanism for actuating said pitman with its plunger, the combination of a base connecting the bale chamber with the power mechanism, a rotatable crosshead having rollers in its ends mounted on said base; a stationary roller attached to said base opposite said crosshead and a pitman having an inclined surface adapted to work between said crosshead and said stationary roller substantially as set forth.

2. In a baling press having a bale chamber, a plunger, a pitman, a power mechanism for operating said pitman with its plunger, the combination of a base connecting the bale chamber with the power mechanism, a rotatable crosshead having rollers in the ends mounted on said base, a stationary roller attached to said base opposite said crosshead and a pitman having an inclined surface adapted to work between said crosshead and said stationary roller; an extension on end of pitman adapted to work against said stationary roller and act as a guide after the pitman end has passed beyond the roller.

3. In a baling press having a bale chamber, a base connecting said bale chamber and power mechanism, a rotatable crosshead mounted on said base—a sweep for operating said crosshead, all mounted on suitable wheels and axles for moving from place to place, the combination of the rotatable crosshead having a suitable sweep fastened to it and an axle having detachable braces arranged to attach to said sweep so it can be used as a tongue.

4. In a baling press having a bale chamber, a pitman with plunger attached thereto and a base connected to said chamber, the combination of a plate secured to pitman and a spring actuated convex disk attached to base substantially as set forth and for the purpose mentioned.

5. In a baling press having a bale chamber, a pitman with plunger attached thereto and a base connected to said chamber, the combination of a plate secured to pitman and a spring actuated convex disk attached to base, a coil spring above said disk and a bolt passing through said disk and said spring and a regulating nut on said bolt substantially as set forth and for the purpose mentioned.

6. In a baling press in combination with the pitman and rebound spring, a combination rebound spring fastening, pitman stop, and wear plate combined as set forth and for the purpose set forth.

In testimony whereof I affix my signature in the presence of two witnesses.

FREDERICK W. WILLIAMS.

Witnesses:
R. A. WILLIAMS, Jr.,
R. A. McCORD.